United States Patent Office 3,558,764
Patented Jan. 26, 1971

3,558,764
PROCESS FOR PREPARING MICROPOROUS FILM
Robert B. Isaacson, Rahway, N.J., and Harvey S. Bierenbaum, Worcester, Mass., assignors to Celanese Corporation, New York, N.Y., a corporation of Delaware
Continuation-in-part of application Ser. No. 577,439, Sept. 6, 1966. This application June 23, 1969, Ser. No. 835,367
Int. Cl. D01d 5/12
U.S. Cl. 264—210                                    7 Claims

ABSTRACT OF THE DISCLOSURE

A method is disclosed and claimed for the production of polymeric films (e.g. polyethylene, polypropylene or polyacetal films) characterized by an open-cell structure and an apparent density lower than the actual density of the original polymers. Such products are prepared by first extruding a film, next drawing down this film at a high rate, then annealing it and cold drawing it and finally heat-setting the cold drawn film. The thus-produced polymeric films are particularly useful for such applications as microporous membranes.

INVENTION

Figure 1:
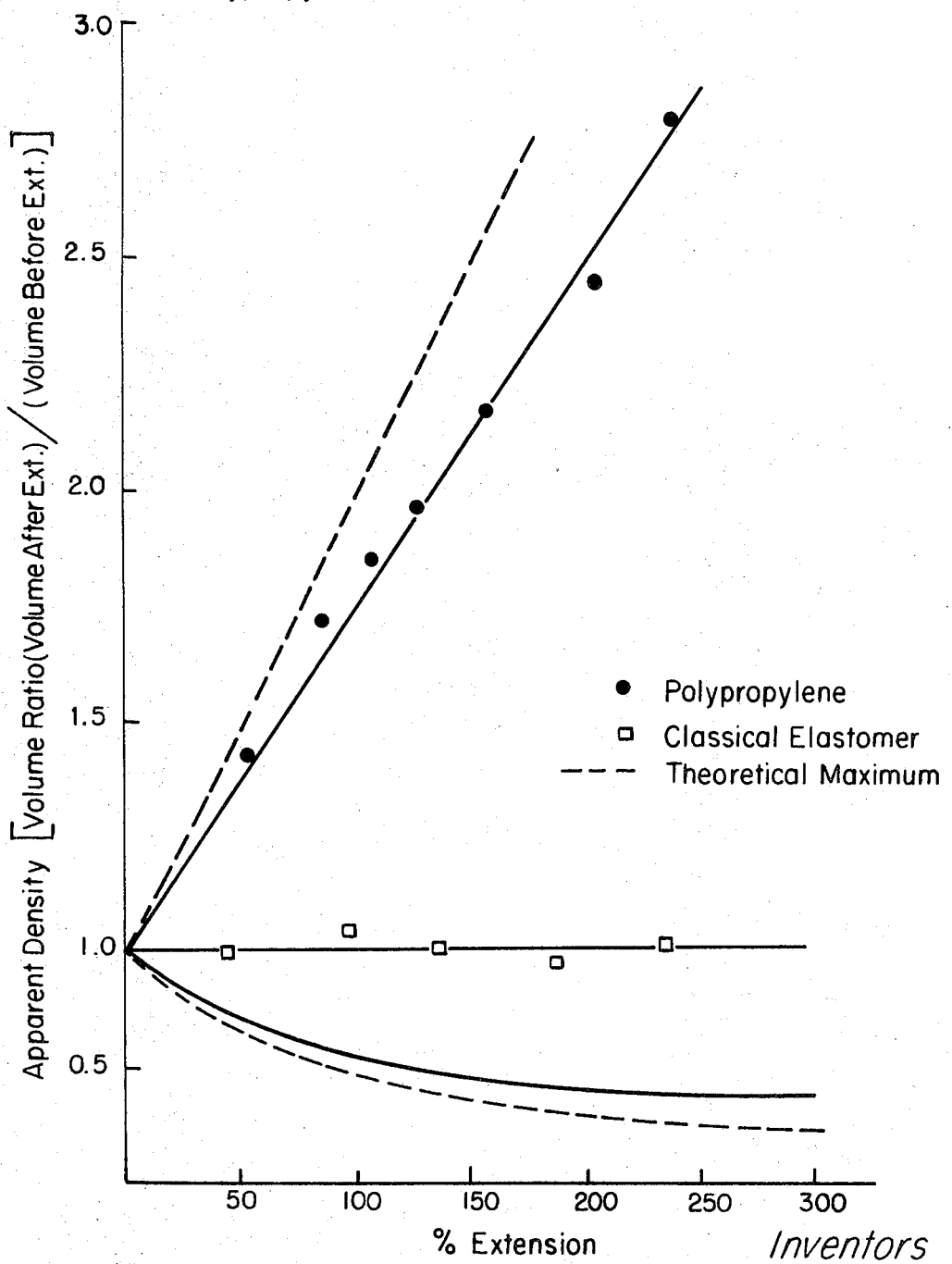

This invention is a continuation-in-part of applicants' co-pending application Ser. No. 577,439 filed on Sept. 6, 1966, now abandoned.

This invention relates to novel films characterized by an open-celled structure and by a low apparent density and to a process for preparing same from crystalline polymers. More particularly, this invention relates to novel films having an open-celled structure evidencing an optimum pore size distribution and to a process for preparing same.

Porous compositions are of two general types; one type in which the pores are not interconnected, and which constitute foams or cellular plastics, and the other type in which the pores are essentially interconnected through tortuous paths which may extend from surface to surface of the structure. The microporous structures of the present invention are of the latter type.

The development of plastic materials possessing outstanding physical qualities has resulted in an extensive search for plastic materials which evidence a microporous structure in addition to their other desirable qualities. Generally, however, the plastic sheet or film materials encountered in the prior art have been unsatisfactory in this connection due to the problem of obtaining materials having optimum porosity which problem is mainly attributable to the difficulty in obtaining a microporous structure having uniform pore sizes in a desired range.

It has been proposed to prepare porous filters from thermoplastic synthetic resin by sintering the substances in the form of powders or granules, using a moderate pressure so that they will adhere together. Instead of heat, solvents can be used. In either case, the object is to adhere the particles together, forming aggregates, but while the aggregates must be tightly bonded, the interstices between them must be retained to form pores. However, neither of these procedures has been satisfactory, because it has been found to be quite impossible to prepare uniform structures by this means. When thermoplastic synthetic resins are heated above their softening point, even under slight pressures they tend to deform readily and even to flow, with the result that it is easy for the aggregates to be displaced, forming non-uniform pores in various sections, and even to collapse and bond to such an extent that the mass is actually non-porous. Naturally, the smaller the particle size of the synthetic plastic, the more difficult it is to prepare a porous material by this means. As a practical matter, it has been found to be impossible to prepare by this method structures of significant porosity from plastic materials smaller in size than 150 mesh.

In order to overcome the problems heretofore encountered, it has been proposed to employ film materials which unlike the structures of the prior art, possess apparent densities lower than the polymer materials from which this type of material is formed, usually no greater than 90%, preferably about 50 to 75% of the densities of the corresponding polymer materials and which, surprisingly, evidence a porous, open-celled structure. The sizes of the passageways to the voids or pore spaces of said open-celled structure accessible to the outside of the film are under 5000 angstrom units, and generally range from between about 150 to 5000 angstrom units, as determined by mercury penetration porosymmetry which measurement also determines the volume of such void or pore space.

While these structures exhibit the desired microporous structure, i.e., about 99% of the pores are accessible from the outer surface of the porous structure, said structures generally have been unsatisfactory due to the non-uniformity of the pore sizes of the structure. This lack of uniformity has in many instances almost negated the permeability of the microporous structure. Surprisingly, however, it has been found that the pore sizes of the structure can be optimized, i.e., rendered uniform in size, if certain critical process variables are practiced during fabrication of the microporous structure. Hence, it has been discovered that if the sheets or films of the present invention are stretched to a critical degree during the processing thereof, a microporous structure of an essentially uniform pore size results.

Broadly, the films suitable for use herein are prepared by extruding in the form of a film an extrudable molten polymer, e.g., a polymer having a crystallinity of at least about 40% at a suitable melt temperature. The thus-extruded film is taken up at a prescribed drawdown ratio and is annealed, e.g., at a temperature in the range of about 5 to 100° C. below the crystalline melting point of the polymer. This annealing step is found to impart the desired elasticity to the film so as to characterize same as a precursor for forming the desired open-celled product. Such precursor film is then drawn, e.g., at a draw ratio which preferably ranges from about 1.3:1 to about 2.5:1 (i.e. 30 to 150% extension) and is subsequently heat-set or annealed to stabilize the resultant product.

The unconventional characteristic of the above-discussed film is that when such precursor is subjected to a degree of stretch below its breaking point, the ratio of the total gross volume of the stretched film to that of the unstretched film is significantly greater than 1. This is surprising and totally unexpected since the ratio of total gross volume of a given mass of an article of an elastic material such as rubber, i.e., a classical elastomer in the stretched state to that of said article in the unstretched state has been found to be substantially 1, i.e., there is no increase of total gross volume of these articles when they are stretched. Moreover, when a conventional article, e.g., an article synthesized of nylon, polyester, polypropylene, and the like, is inelastically stretched, e.g., "cold drawn," the ratio of total gross volume of stretched to unstretched material is generally less than 1, i.e., the apparent density of the stretched article is higher than that of the unstretched article. Expressed another way, the cross section of an elastic article of rubber or classical elastomer, or of an ordinary inelastic article which is stretched, e.g., to increase orientation, decreases on stretch to the extent that the length of the article increases so that the total gross volume of the stretched article is approximately equal to or less than that of the unstretched article. This is in contrast to what occurs when an elastic crystalline precursor contemplated by this invention is suitably stretched or drawn and is subsequently heat set or annealed.

In the present instance, the decrease in the cross section of the article on stretch is either zero or extremely small and such decrease in cross section does not make up for the increase in length on stretching, so that the total gross volume of the stretched article is substantially higher than that of the unstretched article. As the total gross volume of the fiber being stretched increases, its apparent density decreases proportionately.

As used herein, the term "apparent density" signifies the weight per unit of "gross volume" of the film where "gross volume" is determined by the amount of mercury infused into the film by high pressure, see R. G. Quynn et al. in Journal of Applied Polymer Science, vol. 2, No. 5, pages 166–173 (1959).

As used herein, the term "open-celled structure" signifies that the major portion of the void or pore space of the structure within the geometric confines of the film is accessible to the outside planar surfaces of the film.

In order to illustrate the above-discussed behavior, the volume changes of stretched articles, e.g., polypropylene and typical classical elastomer, were determined by measuring the cross section of the articles. The volume at any degree of stretch or extension could then be compared with the original volume. The results are shown in the accompanying FIG. 1, which is incorporated herein by reference.

In interpreting FIG. 1 the dashed line represents the maximum theoretical volume increase that could be caused by extension. For no volume increase the volume ratio is unity, and the classical elastomer manifests such behavior. However, the polypropylene precursor exhibits extremely great increases in volume upon stretching, i.e., close to the theoretical maximum.

The densities of the same articles in the stretched state were porosimetrically determined by mercury penetration and are also shown on FIG. 1. Here, again, the dashed line represents the maximum theoretical decrease in apparent density. For no decrease in the apparent density, the value is unity, and the typical classical elastomer evidences such behavior. However, the propylene precursor exhibits a surprising decrease in the apparent density upon stretching, close to the theoretical maximum. Further, examination of the low density polypropylene article under an optical microscope showed it to be highly porous.

From the foregoing, it is logical to conclude that the pore size distribution in the stretched polypropylene article would be dependent on, and be directly proportional to, the degree of extension of said article. Hence, it is also logical to conclude that as the volume ratio increased and the apparent density decreased, the porosity of the extended article would increase and the concomitant characteristics, e.g., gas permeability (to water vapor, $O_2$, $CO_2$, $N_2$), dye receptivity, penetration by salts and other chemicals, rates of topochemical reaction, and the like would also be affected in a directly proportional relationship. Surprisingly, however, it was discovered that while pore size distribution, as well as the characteristics dependent thereon, is strongly dependent on the extension of the article, optimum pore size distribution is found at extensions less than 150%, i.e., at intermediate extensions and extensions less than intermediate rather than at higher extensions. Further, it was found that at extensions falling within a narrow range, i.e., between about 50% and about 100%, a disproportionately high percentage of pores in the 1000–2000 angstrom range (as measured by mercury intrusion porosymmetry) was encountered. This high percentage of pores in the 1000–2000 angstrom range was also manifested in the physical characteristics, permeability, etc. of the films. Thus, contrary to expectation, it was found that the amount of solvent absorbed into the articles was a maximum at 50–100% extension and also, contrary to expectation, the amount fell off at higher extensions. This same unconventional behavior was observed with the rates of various topochemical reactions, gas permeability, dye receptivity, penetration of salts and other chemicals, etc. Hence, the present invention is predicated on the surprising discovery that the open-celled low density articles described above behave as a more porous substrate at intermediate extensions, i.e., less than about 150% and most preferably about 50–100%, for polypropylene articles, than at higher extensions. It is, of course, understood that higher and lower extensions may be employed, however, the desired optimum pore size distribution will not be achieved as demonstrated in FIG. 2.

The films of the present invention are formed from precursor films of a relatively crystalline film-forming polymer having an elastic recovery at zero recovery time (hereinafter defined) at 25° C. and 65% relative humidity, of about 50 to about 90% when subjected to a standard strain (extension) of 50%, and preferably an elastic recovery at zero recovery time of at least about 80% when subjected to a strain of 50%. These precursor films, as well as the preparation thereof, are further defined in copending application Ser. No. 572,601, filed on Aug. 15, 1966.

It should be noted that although a standard strain of 50% is used to identify the elastic properties of the precursor films of this invention, such strain is merely exemplary. Such precursor films will, of course, generally have elastic recoveries even higher at strains less than 50% than they do at 50% strain, and such films also have relatively high elastic recoveries at strains substantially higher than 50%, e.g., from strains of say 100%.

The precursor film utilized in the preparation of the low density film of the present invention must be differentiated from film formed from classical elastomers. With such classical elastomers the stress-strain behavior, and particularly the stress-temperature relationship, is governed by an entropy-mechanism of deformation (rubber elasticity). The positive temperature coefficient of the retractive force, i.e., decreasing stress with decreasing temperature and complete loss of elastic properties at the glass transition temperature are particular consequences of entropy-elasticity. The elasticity of the precursor films utilized herein, on the other hand, is of a different nature. In qualitative thermodynamic experiments with these precursors, increasing stress with decreasing temperature (negative temperature coefficient) may be interpreted to mean that the elasticity of said materials was not governed by entropy effects but depended on an energy term. More significantly, it was found that the precursor films of this invention retained their "stretch" properties at temperatures where entropy-elasticity could no longer be operative. Thus, it may be concluded that the "stretch" mechanism of the precursor films is based on energy-elasticity and may be referred to as "non classical" elastomers.

The above characteristics necessary to the precursor films can be accomplished by employing a critical combination of process variables and process steps. Broadly the necessary process steps comprise the forming, i.e., extrusion of the films under critical conditions followed by an annealing step to impart the desired degree of elasticity. The necessary process conditions comprise: (1) a rapid rate of drawdown, (2) a high drawdown ratio and, (3) a low melt temperature, i.e., a melt temperature substantially closer to the melt temperature of the film-forming polymer than in conventional extrusion processes.

The rapid rate of drawdown may be accomplished, for example, in slit die extrusion by providing the take-up roll or spool for the extruded film at a distance not more than two inches, and preferably not more than one inch, from the extrusion slit or orifice. At the same time, said takeup roll must be operated at a high rate, e.g., a speed of at least 25 feet/min. of the film, measured at said roll since the takeup rate of the film actually varies at the extrusion slit (where the film is relatively thick) and at the takeup roll (where the film is comparatively thinner).

The drawdown ratios suitably employed to prepare the precursors range from about 20:1 to about 180:1 and preferably range from about 30:1 to about 125:1.

The melt temperature for extrusion of the precursors is in general no higher than 100° C. above the melting point of the polymer and most suitably in the range of 10 to 40° C. above such melting point, while the drawdown ratio of extrusion, i.e., ratio of linear velocity of the take-up roll to the linear velocity of extrusion is at least 20:1. The annealing step is generally carried out at a temperature in the range of about 5 to 100° C. below the melting point of the polymer for a period of at least 10 seconds.

The first of two essential steps of the present invention is drawn or stretched. This can be done continuously in connection with an extrusion unit or the film may be drawn in a separate step. Regardless of which procedure is followed, the extruded film must be drawn to accomplish the objects of the invention. By "extruded" film is meant film as it first solidifies on emergence from the extruder. The extruded film is drawn to impart the open-celled structure and to reduce the apparent density of same. The precise degree of drawing is critical to this invention in that an optimization of useful properties takes place at extensions intermediate or less than intermediate rather than at extensions greater than intermediate.

In order to obtain optimum levels of the characteristics mentioned hereinbefore, the extruded films should not be drawn or extended to an amount greater than 150% of their original length. As hereinbefore set forth, extensions of from about 30% to about 150% (i.e., draw ratios of from 1.3:1 to about 2.5:1) are preferred to achieve the optimized distribution of pore sizes of the subject low density films. Extensions of as low as 10% and as high as 1,000% may be employed, but the desireable quality of the films (e.g., their optimized low density distribution) will not be achieved. This result is set forth in FIG. 2 which is incorporated herein by reference. In order to attain maximization of the desired utility of the invention, e.g., maximum gas permeability, dye receptivity, etc., optimum pore size and the like, it is preferred to extend the film from about 30% to about 150% of their original lengths and it is most preferred to extend the film about 50 to 100% of their original lengths.

In accordance with the present invention, the film is preferably "cold drawn" to impart the desired voidy structure. In this operation the film is drawn at the above draw ratios at ambient or near-ambient temperatures. The drawing per se may be performed in any convenient manner using known techniques where a film is positively forwarded by one moving means to a second moving means operating at a higher speed. The temperature of the film per se being drawn is referred to herein as the draw temperature.

Figure 5:
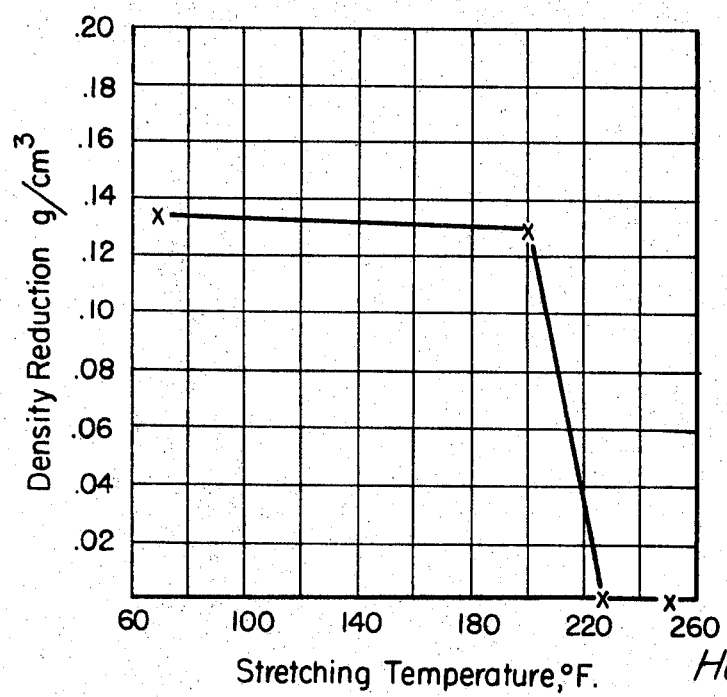

The present invention also contemplates drawing the film at sub-ambient temperatures as well as at temperatures above ambient. However the upper limit of the draw temperature ranges has been found to be critical and it is essential that this limit not be exceeded. This criticality is illustrated by graphical means in FIG. 5 of the drawings which is incorporated herein by reference. The graph presented compares the density reduction of a typical polypropylene film with the drawing or stretching temperature utilized. From the graph it is easily discernible that substantial reduction in the apparent density of the film can be effected up to a temperature of about 200° F. (93.3° C.) but when this temperature is exceeded there is a marked decrease in the reduction of the apparent density of the film. Surprisingly in this instance essentially no reduction can be accomplished when the upper limit of the drawing operation is exceeded by even a small amount. For instance see FIG. 5 wherein at the stretching temperature of 200° F. a density reduction of about 0.13 g./cm.$^3$ was achieved as compared to a stretching temperature of 220° F. wherein a density reduction of only about 0.03 was achieved. Accordingly with respect to polypropylene films the critical stretching temperature of 200° F. may be exceeded but at the expense of achieving a final product with a poor microporous quality. Accordingly the polypropylene films of the present invention are preferably not drawn at a temperature in excess of the 200° F. upper limit and the polyethylene film not in excess of the 220° F. If acetal films are contemplated they are not drawn at a temperature in excess of 255° F. Although graphs relating to the latter two species have not been included herein similar results would be achieved at their respective critical temperatures.

When the film is drawn at temperatures above ambient said film may be heated by any conventional means. Preferably the film is heated by heated moving rolls. However the film may also be heated by passage over a heated plate through a heated liquid a heated gas or the like.

The second essential step in the process of this invention is the step of heat setting or annealing the film, after the drawing thereof, while said film is in the tensioned state. It has been found that heating the drawn film in a tensioned state at a temperature of 80° C. or above has a remarkable influence on the dimensional stability of the open-celled, low density characteristics of same. Accordingly, the drawn film is stabilized against excessive shrinkage, etc. by heating at a temperature which may be somewhat higher than the drawing temperature and while being held under a tension such that the film is not free to shrink or can shrink to only a controlled extent, e.g., not greater than 15% of the initial length. In order to insure maximum relaxation of the strains introduced into the films during the earlier processing thereof and thus impart the desired stability, the heat treatment is preferably carried out at a temperature within the range of from about 100° C. to about 150° C. for polypropylene, 100 to 150° C. for acetal polymers, 100 to 135° C. for polyethylene, etc. The upper limit of the temperature parameters is seen to be critical in that some dissipation of the voidy structure especially the voids of the herein desired pore space, is encountered at temperatures above the foregoing limits. The period of heat treatment should be longer than about 0.1 second at the higher annealing temperatures and may be within the range of about 0.5 second to about 30 minutes at the lower annealing temperatures, preferably about 2 seconds to 15 minutes. The drawing operation and the heat treatment is preferably carried out sequentially. As may be surmised from the foregoing discussions, the apparent density of the resulting heat treated low density film is significantly below that of the precursor film.

The resultant film, in a tensionless state, has an apparent density lower than the density of the polymeric precursor material from which it is formed, usually no greater than 95%, preferably about 50 to 75% of the densities of the corresponding polymer material. The sizes of the passageways to the void or pore spaces of the open-celled film structure accessible to the outside planar surfaces of the film are generally under 5000 angstrom units, e.g., 150 to 5000 angstrom units and optimized in the 1000–2000 angstrom unit range, as determined by mercury penetration porosymmetry, which measurement also determines the volume of such void or pore space. The final crystallinity of these films is preferably at least 30%, more preferably at least 40% and more suitably at least 50%, e.g., 50 to 100%.

As stated, the elastic precursor films employed in this invention are composed of a polymer of a type capable of developing a significant degree of crystallinity, as contrasted with more conventional or "classical" elastic materials such as a rubber which are substantially amorphous in the unstretched or tensionless state.

The significant group of polymers to which this invention may be applied are the olefin polymer, e.g., polypropylene, poly-3-methyl butene-1, poly-4-methyl pentene-1, polyethylene as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1. These polymers in the form of films generally have a percent crystallinity of at least 50%, e.g., 50 to 60%.

While the present disclosure and examples are directed primarily to the aforesaid polyolefin polymers, the invention also contemplates the high molecular weight acetal polymers. While both acetal (or oxymethylene) homopolymers and copolymers are contemplated, the preferred oxymethylene polymer is a "random" oxymethylene copolymer, i.e., one which contains recurring oxymethylene, i.e, $-CH_2-O-$, units interspersed with $-OR-$ groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and wherein a major amount of the $-OR-$ units exists as single units attached to oxymethylene groups on each side. Examples of preferred polymers include copolymers of trioxane and cyclic ethers containing at least two adjacent carbon atoms such as the copolymers disclosed in U.S. Pat. No. 3,027,352 of Walling et al. These polymers in film form also have a crystallinity of at least 50%, e.g., 50 to 60%.

Other relatively crystalline polymers to which the invention may be applied are polymethylene sulfide, polyethylene sulfide, polyphenylene oxide, polyamides such as polyhexamethylene adipamide (nylon 66) and polycaprolactam (nylon 6) and polyesters such as polyethylene terephthalate.

The types of apparatus suitable for forming the precursor film products of this invention are well known in the art. For example, a conventional film extruder equipped with a shallow channel metering screw and coathanger die, is satisfactory. Generally, the resin is introduced into a hopper of the extruder which contains a screw and a jacket fitted with heating elements. The resin is melted and transferred by the screw in the die from which it is extruded through a slot in the form of a film from which it is drawn by a take-up roll. Obviously, more than one take-up roll in various combinations may be used.

Using this type of apparatus, film may be extruded at a drawdown ratio of about 20:1 to about 180:1, preferably about 30:1 to about 125:1. The die opening or slot width may be in the range, for example, of about 30 to 200 mils. Polypropylene may be extruded at a melt temperature of about 180° to 260° C., preferably 195° to 225° C. Polyethylene may be extruded at a melt temperature of about 175° to 225° C. while acetal polymers, e.g., of the type disclosed in U.S. Pat. No. 3,027,352, may be extruded at a melt temperature of about 185° C. to 235° C., preferably 195° to 215° C.

The extrusion operation is necessarily carried out with rapid cooling and rapid drawdown in order to obtain maximum elasticity. This may be accomplished by having the take-up roll relatively close to the extrusion slot, e.g., within two inches and, preferably, within one inch, and rotating as fast as possible without breakage. An "air knife" may be employed within one inch of the slot. The take-up roll may be rotated, for example, at a speed of 20–1000 ft./min., preferably 50 to 500 ft./min.

While the present invention has been directed to slit die extrusion methods, an alternative method of forming the precursor films contemplated by this invention is the blown film extrusion method wherein a hopper and an extruder are employed which are substantially the same as in the slot extruder described above. From the extruder, the melt enters a die from which said melt is extruded through a round slot to form a tubular film having an initial diameter $D_1$. Air enters the system through an inlet and is distributed by means of air ring or similar means through an opening into the interior of said tubular film and has the effect of blowing up the diameter of the tubular film to a diameter $D_2$. A second source of air is also provided and impinging means direct this air about the extruded tubular film so as to quickly and effectively cool same. After a short distance during which the film is allowed to completely cool and harden, it is wound up on a take-up roll.

Using the blown film method, the drawdown ratio is preferably 20:1 to 180:1, the slot opening 20 to 200 mils, the $D_2/D_1$ ratio 0.5 to 6.0 and the take-up speed 30 to 700 ft./min. The melt temperature may be within the ranges given previously for straight slot extrusion.

As stated previously, the extruded precursor film may be initially annealed in order to develop the desired range of elasticity. Generally, this first annealing is carried out at a temperature in the range of about 5° to 100° C. below the crystalline melting point of the polymer for a period of at least 5 seconds. Thus, for polypropylene, the preferred annealing temperature is about 100 to 155° C., while for oxymethylene (acetal) copolymers, the preferred annealing temperature is about 110 to 165° C.

One method of carrying out the annealing step is through the use of hot rolls wherein the annealing time is generally in the range of about 5 to 90 seconds or longer. Another method is by placing the film in the tensionless state in an oven at the desired temperature in which case the residence time is preferably in the range of about 30 seconds to 1 hour.

In accordance with the invention, the extruded and annealed, film passes over a roll and into suitable stretching means. This may be accomplished by passage between a first pair of rolls and then a second pair of rolls; and said second pair of rolls being rotated at higher peripheral speeds than said first pair of rolls so as to effect stretching of the film to the predetermined extent. For example, the first rolls may be rotated at a peripheral speed of about 10 to 1000 feet per minute and the second rolls may be rotated at a peripheral speed of 12 to 1350 feet per minute to impart the desired stretch to the film as it proceeds through the drawing operation. The drawn film then passes from the rolls into a heater and over a roll to a windup means. The peripheral speed of this latter roll may be lower than, the same as, or somewhat higher than that of the second pair of rolls so that the film passing through the heater is held against shrinkage or shrinks to a controlled extent. The rate of feed of the film to the heaters and the heating times are correlated so that at the selected drawing and stabilizing temperature, the desired objectives are accomplished.

The heater, as mentioned, may be heated in any suitable manner, for example, by a heated plate, heated liquid, a heated gas, etc. These, obviously, may be substituted by any equivalent heating medium.

Generally, the polypropylene precursor film of this invention has, at 25° C. and 65% relative humidity, an elastic recovery from 50% extension of about 50 to about 90%, a tensile strength of 10,000 to 35,000 p.s.i., a breaking elongation of 200 to 350%, a modulus of 100,000 p.s.i. (all the foregoing in the machine direction), a haze of 20% to opaque, a void volume .565 to .075 cm.³/gm., and a density .60 to .85 gm./cm.³, the values of the last two properties being determined by mercury porosymmetry.

More pertinent to the utility of the invention, however, the present polypropylene film exhibits properties in the following ranges: $O_2$ transmittance as high as 150,000, generally 110,000 to 150,000; $N_2$ transmittance as high as 130,000, generally 100,000 to 125,000; $CO_2$ transmittance as high as 60,000, generally 40,000 to 55,000; and water vapor transmittance as high as 400, generally 150 to 350, the units of transmittance being given in cc./24 hours, m.$^2$, atm. Advantageously, the distribution of pore sizes in the 1000–2000 angstrom unit range represents 20%–50% of the pores present.

The invention is further illustrated by the following examples.

EXAMPLE I

This example illustrates the affect the amount of extension (percent increase in length of original structure) has on the apparent density (gm./cm.$^3$) and the pore volume (cm.$^3$/gm.) of a polypropylene film.

In this example, crystalline polypropylene of melt index 4.0 and density .905 g./cc. was melt extruded at 380° F. through an 8″ slit die of the coat hanger type using a 1¾″ extruder with a shallow channel metering screw. The length to diameter ratio of the extruder barrel was 24:1. The extrudate was drawn down very rapidly to a drawdown ratio of 180:1, contacted with a rotating casting roll maintained at 185° F. and ¼″ from the lip of the die. The film produced in this fashion was found to have the following properties:

Thickness—.0005 inch
Recovery from 50% elongation at 25° C.—48%

A sample of this film was oven-annealed in the tensionless state of 125° C. for one hour, removed from the oven and allowed to cool. It was then found to have the following properties:

Recovery from 50% elongation at 25° C.—90%

Samples of both films, annealed and unannealed, were extended at room temperature to a series of different elongations, and heat set in the extended state for 5 minutes at 125° C. All samples were then allowed to cool and found to have the following apparent densities and void volumes by mercury porosymmetry.

|  | Apparent density, gm./cm³ | | Pore volume, cm.³/gm. | |
| --- | --- | --- | --- | --- |
|  | Annealed prior to stretching | Not annealed prior to stretching | Annealed prior to stretching | Not annealed prior to stretching |
| Percent extension: | | | | |
| 50 | .804 | .853 | .144 | .070 |
| 100 | .784 | .834 | .174 | .087 |
| 200 | .755 | .831 | .224 | .094 |
| 300 | .734 | .829 | .263 | .096 |

The above apparent density and pore volume comparative data illustrate the respective definite decreasing trend and increasing trend of each characteristic. Hence it would be expected that the more porous films (high pore volume, etc.) would consequently exhibit high permeability, a pore size distribution of large size (in angstrom units) etc. This as hereinbefore disclosed and as herein later illustrated is not the case.

EXAMPLE II

The polymer described in Example I was melt extruded and oven-annealed substantially as per Example I. The resulting precursor was extended to various lengths, i.e., elongations of 50%, 100%, 200% and 300%, and heat set in the extended state for 5 minutes at 135° C. At the end of this period the film was removed from the oven, allowed to cool and the pore sizes present were measured.

The pore sizes present in the film were measured by mercury porosymmetry by the Quynn method in the Journal of Applied Polymer Science, cited hereinbefore.

Figure 2:
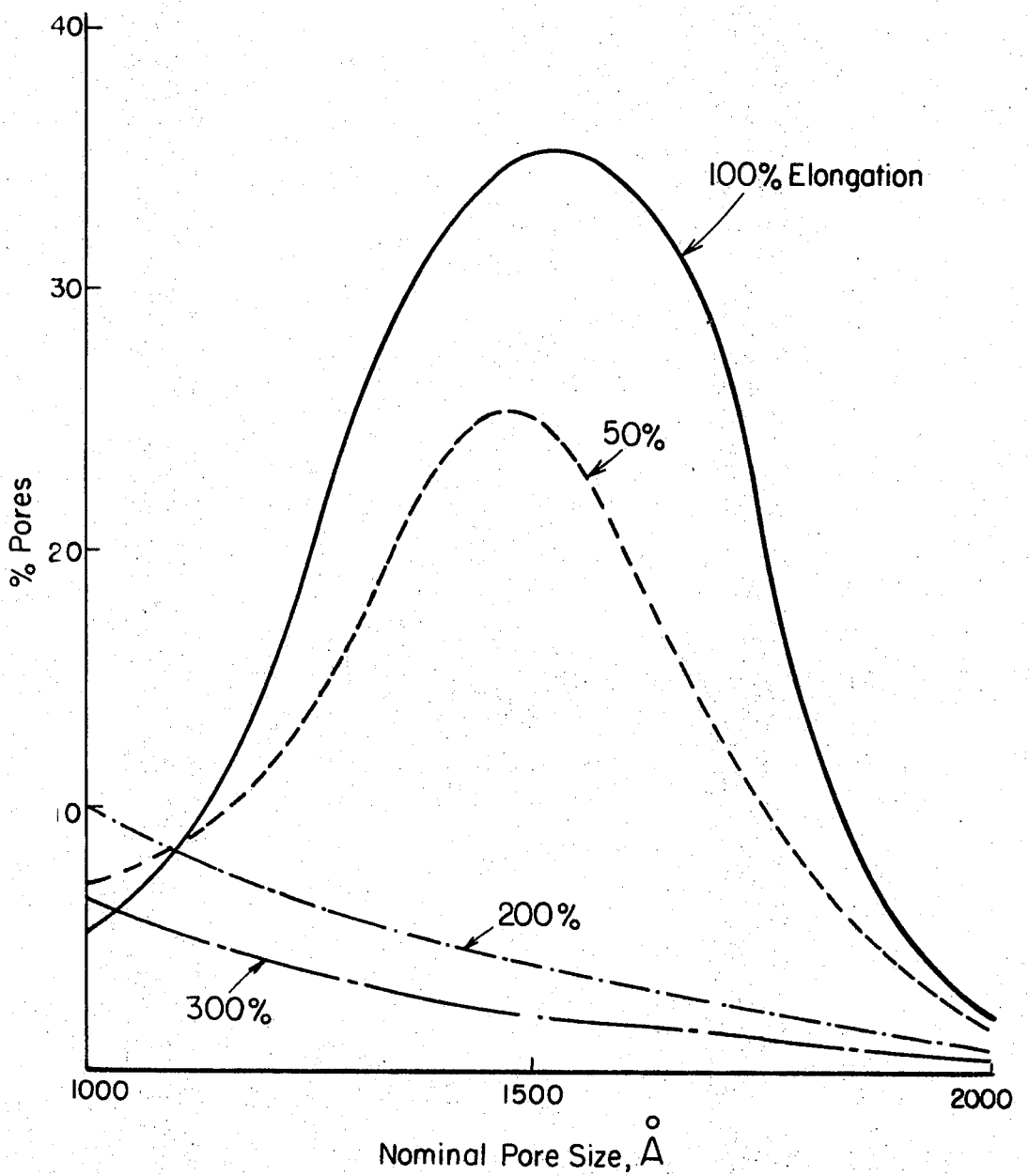

FIG. 2, incorporated herein by reference, illustrates the unexpected pore size distribution of 1000–2000 angstrom units resulting from the various elongations. Thus it was found that the desired 1000–2000 angstrom unit range was extremely pronounced at an intermediate elongation than at the higher elongations.

EXAMPLE III

A series of polypropylene films similar to those employed in Examples I and II were subjected to a solvent sorption test. In this test pre-weighed samples were immersed completely in a particular solvent for a period of 24 hours. After such period the samples were removed and surfaces of each were carefully wiped clean. The thus-treated samples were then weighed with the difference in weights being noted.

Figure 3:
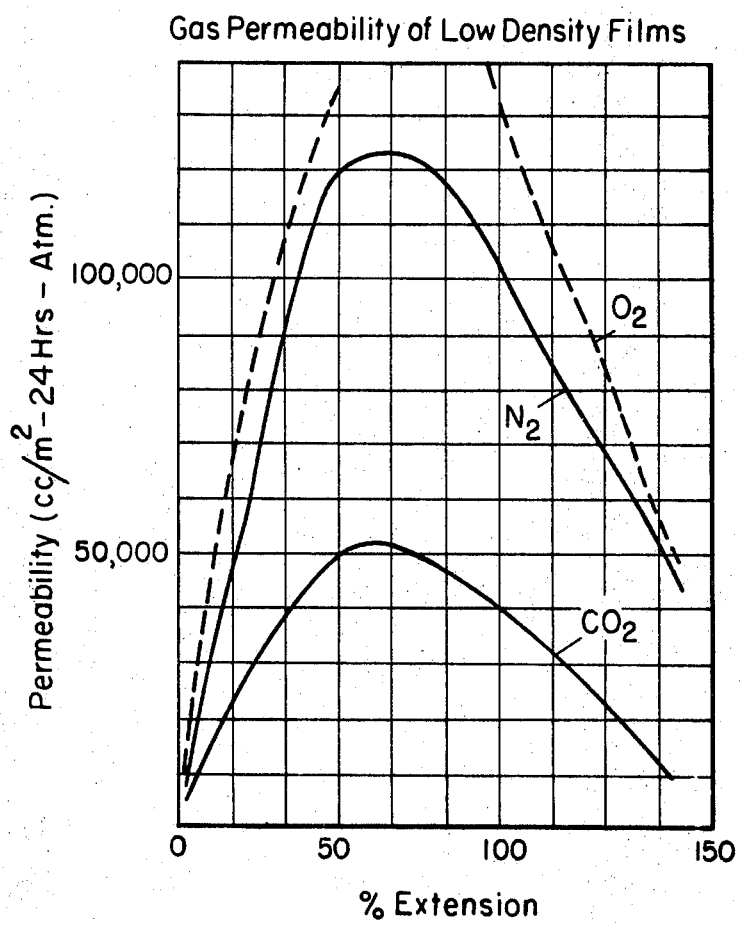

FIG. 3 incorporated herein by reference illustrates the marked effect the elongation has on the solvent sorption of the polypropylene films. The extreme decrease in the sorption slope when 100% elongation is reached is readily apparent. The complete lack of utility in some instances at 150% clearly manifests the criticality of the amount of drawing or extension which must be applied to the films to accomplish the objects of this invention.

This phenomena was also experienced, and to the same significant degree, with other solvents such as methanol, xylene, acetone, benzene, heptane, toluene and carbon tetrachloride.

EXAMPLE IV

In order to illustrate the effect that elongation has on the gas permeability characteristics of various polypropylene films a number of films were extended in a manner similar to that in the preceding examples. The resulting sample films treated so as to observe their respective behaviors with regard to rates of gas permeability, in this instance: $O_2$, $N_2$, $CO_2$ and water vapor.

The tests employed were:

Moisture vapor transmittance—ASTM #9663T—Method B Procedure B
$O_2$, $N_2$, $CO_2$ transmittance—ASTM #D1434–63, Dow Cell Method, except that because of exceedingly high gas permeability, two pieces of film were laminated together with Interchemical Coating #NB483C which was less than .0001 inch in thickness.

Figure 4:
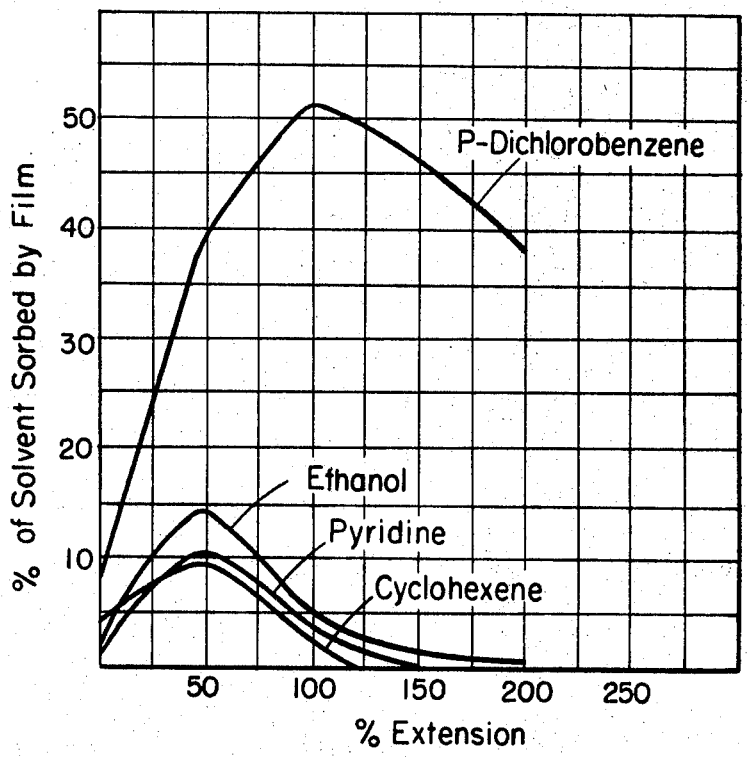

FIG. 4, clearly illustrates the pronounced effect the elongation has on the gas permeability of the films. The almost complete absence of permeability at an elongation of as low as 150% readily emphasizes the necessity for extending the films within the parameters of this invention. The moisture vapor transmittance was found to conform to this behavior with a transmittance of as high as 400 cc./24 hours, m.$^2$, atm.

EXAMPLE V

In order to observe the effect elongation has on the pore size distribution as concerned with penetration by salts or other chemicals, polypropylene films similar to the preceding were stretched and annealed at various elongations and silver was then incorporated into the pores thereof.

Table I which follows indicates the criticality of the amount of elongation has on the pore size distribution and hence on the amount of extraneous matter which may be incorporated. This behavior was similarly encountered when sodium chloride and nickel chloride-dimethylglyoxime was tested in a like manner.

TABLE I

Incorporation of Ag into K film

| Sample treatment: | Percent Ag incorporated |
|---|---|
| Stretched 50% under liquid surface | 3.2 |
| K film: | |
| 50% extended | 6.3 |
| 100% extended | 11.6 |
| 250% extended | 3.5 |

The values of "recovery" hereinbefore referred to are elastic recovery determined as follows at 25° C. and 65% relative humidity:

A sample 15 mm. in width was placed in an Instron tensile property testing machine with the jaw separation being 2" apart. The sample was extended at the rate of 1"/min. until 50% extension was reached. The sample was held at that extension for 1 minute and then relaxed at the same rate as extended. A reading was recorded as soon as a no load condition was indicated by the Instron. The elastic recovery is then calculated as follows:

Elastic recovery $$= \frac{\left(\begin{array}{c}\text{Totol length}\\ \text{when extended}\end{array}\right) - \left(\begin{array}{c}\text{Final distance}\\ \text{between jaws}\end{array}\right)}{\text{Length added when extended}} \times 100$$

EXAMPLE VI

The film-forming polymer of this example was a copolymer having a melt index of 2.5, of trioxane and 2 weight percent based on the weight of the polymer of ethylene oxide of the type described in U.S. Pat. No. 3,027,352, after-treated to remove unstable groups as described in Pat. No. 3,219,623, and suitably stabilized.

The above-described polymer was melt extruded at 375° F. through an 8" slit of the coat hanger type as illustrated in FIG. 2 at a shear rate of approximately 46 reciprocal seconds using a 1" extruder with a shallow channel metering screw. The length to diameter ratio of the extruder barrel was 24:1. The extrudate was drawn down very rapidly to a drawdown ratio of 270:1, contacted with a rotating casting roll maintained at 289° F. and about ¼" from the lip of the die. The film produced in this manner was wound up and found to have the following properties:

Thickness—.0005 inch
Recovery from 50% strain—46%

The polymer was then oven annealed in the tensionless state at 145° C. for 16 hours. At the end of the annealing period it was removed from the oven, allowed to cool and found to have the following properties:

Thickness—.0005 inch
Recovery from 50% elongation at 25° C.—92%
Density as determined by mercury porosymmetry—1.40 g./cm.$^3$ The film was extended at room temperature to 89% of its original length, held in the extended state by metal clamps and heat set in an oven at 150° C. for two minutes. At the end of this period it was removed from the oven, allowed to cool and found to have the following properties:

Void volume as determined by mercury porosymmetry—.18 cm.$^3$/gm.
Density as determined by mercury porosymmetry—1.12 gm./cm.$^3$
Pore size as determined by mercury porosymmetry—100–900 A.

EXAMPLE VII

This example illustrates one of the utilities to which the films of the present invention may be applied; in this instance as a microporous membrane for the desalinization of a saline solution.

The polymer described in Example I was melt extruded as per that example and oven annealed at 145° C. for 16 hours. At the end of this period it was removed from the oven and allowed to cool. One film (No. One) was extended 91% at room temperature and heat set in an oven in the tensioned state at 142° C. for 8 minutes. Film No. Two was unchanged after the first annealing step.

Piece No. One was placed in a supported cell and contacted on one side with a pressurized salt solution (.5 weight percent NaCl at 600 p.s.i.). A solution flux through the film was obtained due to the external pressure gradient and was recorded as 4.2 gal./day/ft.$^2$. The salt concentration of the solution that has been forced through the membrane was found to have been reduced to .17 weight percent. The film was then reversed, i.e., the other side was made to initially contact the flowing pressurized salt solution. Flux and salt content were then found to be 1.8 gal./day/ft.$^2$ and .27 weight percent.

The above procedure was repeated with Piece No. Two. No flux was obtained with either side facing upstream.

EXAMPLE VIII

Crystalline polypropylene of melt index 4.0 and density .905 g./cm.$^3$ was melt extruded at 380° F. through an 8" slit die of the coat hanger type using a 1¾" extruder with a shallow channel metering screw. The length to diameter ratio of the extruder barrel was 24:1. The extrudate was drawn down very rapidly to a drawdown ratio of 90:1, contacted wtih a rotating casting roll maintained at 185° F. and ¼" from the lip of the die. The film produced in this fashion was found to have the following properties:

Thickness—.001 inch
Elastic recovery from 50% strain—49%

The resulting film was divided into two pieces which then were oven annealed at 130° C. for 15 minutes. At the end of this period they were removed from the oven and allowed to cool. Piece No. 1 was stretched 190% at room temperature and heat set in the extended state for 15 minutes at 130° C. Piece No. 2 was unchanged after the first annealing step. Mercury porosymmetry (infusion) analysis of both samples gave the following results:

| | Sample No. 1 | Sample No. 2 |
|---|---|---|
| Penetration volume (cm.$^3$/g.) | .15 | .01 |
| Density (g./cm.$^3$) | .79 | .89 |
| Pore size, A | 100–1,000 | |

EXAMPLE IX

A polyethylene sample having a density of 0.960 and a melt index of 0.7 was melt extruded at 380° F. through a thin annular opening die of 0.040 inch and 4" diameter. The hot tube thus formed was expanded 1.5 times by internal air pressure and cooled by an air stream impinging on the film from an air ring located around above the die. The extrusion was accomplished with an extruder of 20:1 length to a diameter barrel ratio and a hollow channel metering screw. The extrudate was drawn down very rapidly to a drawdown ratio of 100:1 and passed through a series of rollers which collapsed the tube and maintained internal air pressure. After windup at 100 ft./min. the film was found to have the following properties:

EXAMPLE IX

Thickness—.0005 inch
Recovery from 50% strain—45%

The film was then oven annealed in the tensionless state at 115° C. for 16 hours.

After removal from the oven the film was allowed to cool, stretched 50% at room temperature, and heat set in an oven in the extended state under tension for 5 minutes at 120° C. The film treated in this manner was found to have the following properties by mercury porosymmetry.

Apparent density—.785 g./cm.$^3$
Pore volume—.25 cm.$^3$/gm.
Pore size range—100–2000 A.

The values of "recovery" given above are elastic recovery determined as follows at 25° C. and 65% relative humidity:

A sample 15 mm. in width was placed in an Instron tensile property testing machine with the jaw separation being 2" apart. The sample was extended at the rate of 1"/min. until 50% extension was reached. The sample was held at that extension for 1 minute and then relaxed at the same rate as extended. A reading was recorded as soon as a no load condition was indicated by the Instron. The elastic recovery is then calculated as hereinbefore set forth.

EXAMPLE X

The process described in Example VIII was repeated except instead of stretching "Piece No. 1" at room temperature, a higher temperature (200° F.) was employed, and the resultant denstiy was 0.78 g./cm.$^3$ (i.e., a density reduction from 0.905 g./cm.$^3$ of about 0.13).

EXAMPLE XI

The process described in Example X was repeated except that a stretching temperature of 220° F. was employed and the resultant density was 0.88 g./cm.$^3$.

The other properties mentioned were determined with standard ASTM methods as follows:

Tensile strength—ASTM #D882—Method A sample width 15 mm.
Breaking elongation—ASTM #D882—Method A sample width 15 mm.
Modulus—ASTM #D882—Method A sample width 1 inch
Moisture vapor transmittance—ASTM #9663T—Method B, Procedure B
$O_2$, $N_2$, $CO_2$ transmittance—ASTM #D1434–63, Dow Cell Method, except that because of exceedingly high gas permeability, two pieces of film were laminated together with Interchemical Coating #NB483C which was less than .0001 inch in thickness.
Density—As determined by mercury penetration. See Textile Research Journal, vol. 33, pp. 21 et seq. (1963) by R. G. Quynn.
Haze—ASTM #D1003, Procedure A as per FIG. 2.

The values of percent crystallinity given above are determined using the procedure described in an article by R. G. Quynn et al. in Journal of Applied Polymer Science, vol. 2, No. 5, pp. 116–173 (1959).

The elastic films of this invention are useful as printable wrappers, microporous membranes for dialysis operations, etc.

It is to be understood that the foregoing detailed description is given merely by way of illustration and that many variations may be made therein without departing from the spirit of the invention.

What is claimed is:
1. A process for the production of a film characterized by a microporous, open-celled structure, said film having an apparent density no greater than about 90 percent of the density of the polymer comprising the film, said polymer having a crystallinity when solid of at least 40 percent and being selected from the group consisting of polyethylene, polypropylene and polyacetal, and said film being characterized by an open-celled structure comprising pore spaces wherein the size distribution of said pore spaces is optimized in the 1000–2000 angstrom range, said process comprising:
 (a) extruding said polymer at a melt temperature no higher than about 100° C. above the crystalline melting point of said polymer, so as to form a film,
 (b) taking up the resulting film at a drawdown ratio of from 20:1 to about 180:1
 (c) rapidly cooling the extruded film while it is being drawn down,
 (d) annealing the resulting film at a temperature in the range of about 5 to 100° C. below the crystalline melting point of said polymer for a period of at least 5 seconds in order to develop in the resulting film an elastic recovery from a 50° strain of at least 50 percent at 25° C.,
 (e) cold drawing the film at a draw ratio of from about 30 percent to about 150 percent of its total length at a temperature no greater than about 200° F. when said film comprises polypropylene, no greater than about 220° F. when said film comprises polyethylene and no greater than about 255° F. when said film comprises polyacetal,
 (f) heat setting the thus cold drawn film at a temperature of from about 80° C. to about 150° C. while under tension.

2. The process of claim 1 wherein the film having an elastic recovery from a 50 percent strain of at least 50 percent at 25° C., is cold drawn at a draw ratio of from about 50 to about 100 percent of its total length.

3. A process for the production of a film characterized by a microporous, open-celled structure, said film having an apparent density no greater than about 90 percent of the density of the polymer comprising the film, said polymer having a crystallinity when solid of at least 40 percent and being selected from the group consisting of polyethylene, polypropylene and polyacetal, and said film being characterized by an open-celled structure comprising pore spaces wherein the size distribution of said pore spaces is optimized in the 1000–2000 angstrom range, said process comprising:
 (a) cold drawing an elastic film of said polymer, said elastic film having an elastic recovery from 50 percent strain of at least 50 percent at 25° C., at a draw ratio of from about 30 percent to about 150 percent of its total length at a temperature no greater than about 200° F. when said film comprises polypropylene, at a temperature no greater than about 220° F. when said film comprises polyethylene, and at a temperature no greater than about 255° F. when said film comprises polyacetal, and
 (b) heat setting the thus cold drawn film at a temperature of from about 80° C. to about 150° C. while under tension.

4. The process of claim 3 wherein said elastic film is cold drawn at a draw ratio of from about 50 to about 100 percent of its total length.

5. The process of claim 1 wherein said polymer is extruded in the form of a tubular film with air pressure in its interior which expands the tubular film to a large diameter, the ratio of diameter of the blow up film to the diameter of the film as extruded being in the range of 0.5 to 6.0, at a draw down ratio of 20:1 to about 180:1.

6. The process of claim 1 wherein said polymer is extruded at a melt temperature in the range of 10 to 40° C. above the melting point of the polymer.

7. The process of claim 6 wherein the extruded film is taken up at a drawdown ratio of from about 50:1 to about 125:1.

References Cited

UNITED STATES PATENTS

| | | | |
|---|---|---|---|
| 2,325,060 | 7/1943 | Ingersoll | 8—115.5 |
| 2,799,896 | 7/1957 | Grow et al. | 18—8BX |
| 2,948,583 | 8/1960 | Adams et al. | 264—210F |
| 3,048,467 | 8/1962 | Roberts et al. | 264—210F |
| 3,215,486 | 11/1965 | Hada et al. | 264—210FUX |
| 3,323,190 | 6/1967 | Boltuiew | 264—176FUX |
| 3,330,897 | 7/1967 | Tessier | 264—176F |
| 3,377,415 | 4/1968 | Oppenlander | 264—210F |
| 3,382,306 | 5/1968 | Oppenlander | 264—178 |
| 3,413,397 | 11/1968 | Bierbaum et al. | 264—346X |
| 3,426,754 | 2/1969 | Biernbaum et al. | 128—156 |
| 3,432,590 | 3/1969 | Papps | 264—210F |

JULIUS FROME, Primary Examiner

J. H. WOO, Assistant Examiner

U.S. Cl. X.R.

264—209, 235, 288, 290, 346